United States Patent
Mathew et al.

(10) Patent No.: US 11,789,585 B1
(45) Date of Patent: Oct. 17, 2023

(54) SYSTEM AND METHOD FOR PROVIDING A GRAPHICAL USER INTERFACE

(71) Applicant: The Toronto-Dominion Bank, Toronto (CA)

(72) Inventors: Sangeeta Mathew, Misssissauga (CA); Anand Pandey, Markham (CA); Amanda Vanzante, Oakville (CA); Pasqualino Spensieri, Toronto (CA); Mohamedhussein Hassanali, Vaughan (CA); Rinelda Nanushi, Toronto (CA); Sumit Bansal, Calgary (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 17/988,086

(22) Filed: Nov. 16, 2022

(51) Int. Cl.
*G06F 3/04817* (2022.01)
*G06Q 20/10* (2012.01)

(52) U.S. Cl.
CPC ......... *G06F 3/04817* (2013.01); *G06Q 20/10* (2013.01)

(58) Field of Classification Search
CPC ............................ G06F 3/04817; G06Q 20/10
See application file for complete search history.

(56) References Cited

U.S. PATENT DOCUMENTS

| | | | |
|---|---|---|---|
| 10,068,226 B2 | 9/2018 | Chandrasekaran | |
| 11,188,919 B1 | 11/2021 | Ho | |
| 2003/0098890 A1* | 5/2003 | Makinen | G06F 3/0482 715/810 |
| 2011/0231798 A1* | 9/2011 | Cok | G06Q 10/103 715/823 |
| 2015/0170137 A1 | 6/2015 | Balbus | |
| 2015/0346923 A1* | 12/2015 | Conder | G06Q 10/00 715/739 |
| 2016/0104161 A1 | 4/2016 | Butler | |
| 2016/0306503 A1* | 10/2016 | Youtsey | G06Q 10/06 |
| 2019/0050925 A1* | 2/2019 | Hodge | G06F 3/0482 |

(Continued)

FOREIGN PATENT DOCUMENTS

WO 2022132114 A1 6/2022

*Primary Examiner* — Mong-Shune Chung
(74) *Attorney, Agent, or Firm* — Rowand LLP

(57) ABSTRACT

A server computer system comprises a communications module; a processor coupled with the communications module; and a memory coupled to the processor and storing processor-executable instructions which, when executed by the processor, configure the processor to provide, via the communications module and to a computing device, a graphical user interface that includes interface elements that represent a series of activation steps and identifies one of the activation steps as a current activation step, the representation of the current activation step selectable to communicate with a dedicated server computer system performing the current activation step to display information related to the current activation step; determine that the current activation step has been completed; and update the graphical user interface to disable the representation of the current activation step as selectable; identify another one of the activation steps as a next current activation step; and enable the representation of the next current activation step as selectable to communicate with a dedicated server computer system performing the next current activation step to display information relating to the next current activation step.

20 Claims, 12 Drawing Sheets

(56) References Cited

U.S. PATENT DOCUMENTS

| | | |
|---|---|---|
| 2020/0311715 A1 | 10/2020 | Heidari |
| 2023/0141866 A1* | 5/2023 | VanAntwerp ........ G06Q 10/067 717/120 |

* cited by examiner

US 11,789,585 B1

SYSTEM AND METHOD FOR PROVIDING A GRAPHICAL USER INTERFACE

TECHNICAL FIELD

The present application relates to systems and methods for providing a graphical user interface.

BACKGROUND

Graphical user interfaces are often used to display information.

Graphical user interfaces may result in an unnecessary waste in bandwidth and computer processing power as interaction with the graphical user interface may result in data exchanges between the computing device displaying the graphical user interface and one or more computer server systems providing the graphical user interface and information displayed thereon.

BRIEF DESCRIPTION OF THE DRAWINGS
drawings.

Embodiments are described in detail below, with reference to the following

Like reference numerals are used in the drawings to denote like elements and features.

DETAILED DESCRIPTION OF VARIOUS EMBODIMENTS

Figure 1:
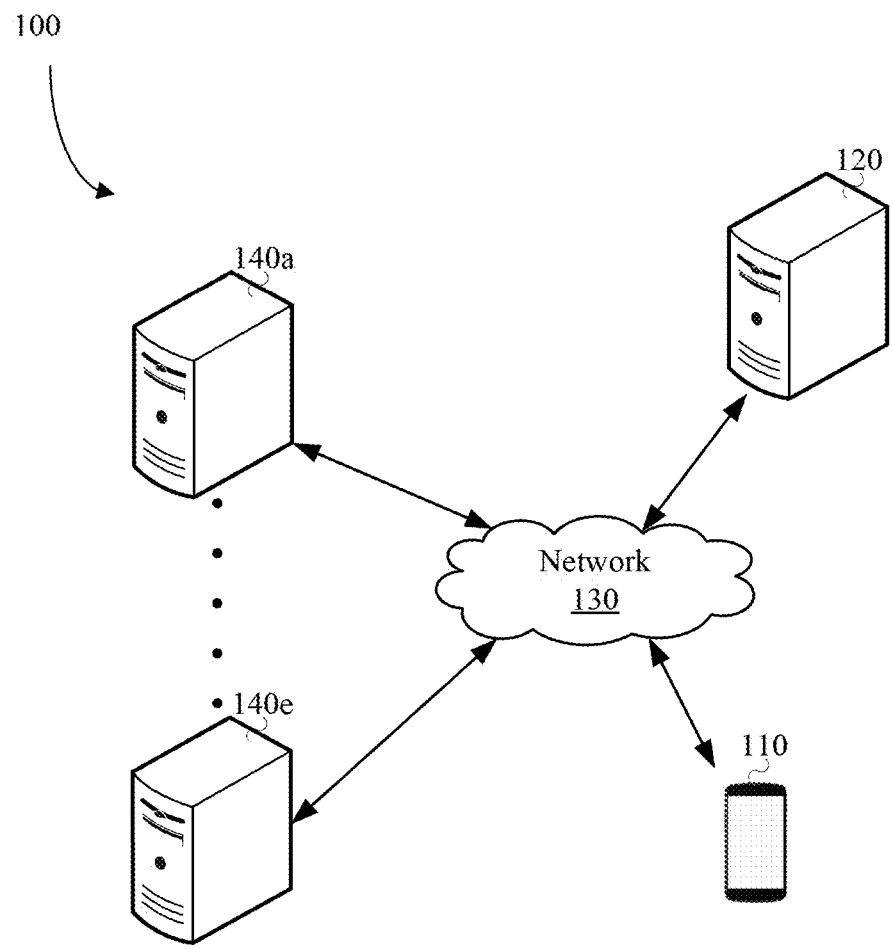
FIG. 1 is a schematic operation diagram illustrating an operating environment of an example embodiment.

Accordingly, in one aspect there is provided a server computer system comprising a communications module; a processor coupled with the communications module; and a memory coupled to the processor and storing processor-executable instructions which, when executed by the processor, configure the processor to provide, via the communications module and to a computing device, a graphical user interface that includes interface elements that represent a series of activation steps and identifies one of the activation steps as a current activation step, the representation of the current activation step selectable to communicate with a dedicated server computer system performing the current activation step to display information related to the current activation step; determine that the current activation step has been completed; and update the graphical user interface to disable the representation of the current activation step as selectable; identify another one of the activation steps as a next current activation step; and enable the representation of the next current activation step as selectable to communicate with a dedicated server computer system performing the next current activation step to display information relating to the next current activation step.

In one or more embodiments, the processor-executable instructions, when executed by the processor, further configure the processor to receive, via the communications module and from the computing device, an indication of selection of the representation of the current activation step; and obtain, in real-time and from the dedicated server computer system performing the current activation step, the information related to the current activation step.

In one or more embodiments, the graphical user interface displays at least one selectable interface element to cause the computing device to communicate with the dedicated server computer system performing the current activation step to perform an operation associated with the current activation step.

In one or more embodiments, the operation associated with the current activation step includes an operation required for completion of the current activation step.

In one or more embodiments, responsive to determining that the current activation step has been completed, the processor-executable instructions, when executed by the processor, further configure the processor to remove the at least one selectable interface element from the graphical user interface; and display at least one next selectable interface element to cause the computing device to communicate with the dedicated server computer system performing the next current activation step to perform an operation associated with the next current activation step.

In one or more embodiments, the operation includes real-time provisioning of a mobile wallet resident on the computing device with a digital payment card.

In one or more embodiments, the at least one selectable interface element causes the computing device to open a camera application resident thereon to enable image capture by an imaging device of the computing device.

In one or more embodiments, the operation includes communicating with a third-party server to obtain tracking information of a physical item associated with the current activation step.

In one or more embodiments, the representation of a particular activation step, when identified as the current activation step, is enabled as selectable to cause the computing device to communicate with a dedicated server computer system performing the particular activation step.

In one or more embodiments, each activation step is performed by a different dedicated server computer system.

According to another aspect there is provided a computer-implemented method comprising providing, via a communications module and to a computing device, a graphical user interface that includes interface elements that represent a series of activation steps and identifies one of the activation steps as a current activation step, the representation of the current activation step selectable to communicate with a dedicated server computer system performing the current activation step to display information related to the current activation step; determining that the current activation step has been completed; and updating the graphical user interface by disabling the representation of the current activation step as selectable; identifying another one of the activation steps as a next current activation step; and enabling the representation of the next current activation step as selectable to communicate with a dedicated server computer system performing the next current activation step to display information relating to the next current activation step.

In one or more embodiments, the method further comprises receiving, via the communications module and from the computing device, an indication of selection of the representation of the current activation step; and obtaining, in real-time and from the dedicated server computer system performing the current activation step, the information related to the current activation step.

In one or more embodiments, the graphical user interface displays at least one selectable interface element to cause the computing device to communicate with the dedicated server computer system performing the current activation step to perform an operation associated with the current activation step.

In one or more embodiments, the operation associated with the current activation step includes an operation required for completion of the current activation step.

In one or more embodiments, responsive to determining that the current activation step has been completed, the method further comprises removing the at least one selectable interface element from the graphical user interface; and displaying at least one next selectable interface element to cause the computing device to communicate with the dedicated server computer system performing the next current activation step to perform an operation associated with the next current activation step.

In one or more embodiments, the operation includes real-time provisioning of a mobile wallet resident on the computing device with a digital payment card.

In one or more embodiments, the at least one selectable interface element causes the computing device to open a camera application resident thereon to enable image capture by an imaging device of the computing device.

In one or more embodiments, the operation includes communicating with a third-party server to obtain tracking information of a physical item associated with the current activation step.

In one or more embodiments, the representation of a particular activation step, when identified as the current activation step, is enabled as selectable to cause the computing device to communicate with a dedicated server computer system performing the particular activation step.

According to another aspect there is provided a non-transitory computer readable storage medium comprising computer-executable instructions which, when executed, configure a processor to provide, via a communications module and to a computing device, a graphical user interface that includes interface elements that represent a series of activation steps and identifies one of the activation steps as a current activation step, the representation of the current activation step selectable to communicate with a dedicated server computer system performing the current activation step to display information related to the current activation step; determine that the current activation step has been completed; and update the graphical user interface to disable the representation of the current activation step as selectable; identify another one of the activation steps as a next current activation step; and enable the representation of the next current activation step as selectable to communicate with a dedicated server computer system performing the next current activation step to display information relating to the next current activation step.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In the present application, examples involving a general-purpose computer, aspects of the disclosure transform the general-purpose computer into a special-purpose computing device when configured to execute the instructions described herein.

FIG. 1 is a schematic operation diagram illustrating an operating environment of an example embodiment. As shown, the system 100 includes a computing device 110 and a server computer system 120 coupled to one another through a network 130, which may include a public network such as the Internet and/or a private network. The computing device 110 and the server computer system 120 may be in geographically disparate locations. Put differently, the computing device 110 and the server computer system 120 may be located remote from one another.

The computing device 110 may be a smartphone as shown in FIG. 1. However, the computing device 110 may be a computing device of another type such as for example a laptop computer, a personal computer, a tablet computer, a notebook computer, a hand-held computer, a personal digital assistant, a portable navigation device, a mobile phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments.

The system 100 may include dedicated server computer systems 140a to 140n, where n is the number of dedicated server computer systems required to complete a series of activation steps. In the example shown in FIG. 1, the number of dedicated server computer systems may include five (5) dedicated server computer systems 140a to 140e. In this example, the series of activation steps may include five (5) activation steps and each activation step may be performed by a different dedicated server computer system 140a to 140e.

As will be described in more detail below, the server computer system 120 may be configured to manage the series of activation steps and/or the dedicated server computer systems 140a to 140e.

The server computer system 120 and the dedicated server computer systems 140a to 140e are computer server systems. A computer server system may, for example, be a mainframe computer, a minicomputer, or the like. In some implementations thereof, a computer server system may be formed of or may include one or more computing devices. A computer server system may include and/or may communicate with multiple computing devices such as, for example, database servers, computer servers, and the like. Multiple computing devices such as these may be in communication using a computer network and may communicate to act in cooperation as a computer server system. For example, such computing devices may communicate using a local-area network (LAN). In some embodiments, a computer server system may include multiple computing devices organized in a tiered arrangement. For example, a computer server system may include middle tier and back-end computing devices. In some embodiments, a computer server system may be a cluster formed of a plurality of interoperating computing devices.

The computing device 110 may be adapted to present a graphical user interface that allows for communication with the server computer system 120. As will be described in more detail below, the graphical user interface may additionally allow for communication with one of the dedicated server computer systems 140a to 140e.

The network 130 is a computer network. In some embodiments, the network 130 may be an internetwork such as may be formed of one or more interconnected computer networks. For example, the network 130 may be or may include an Ethernet network, an asynchronous transfer mode (ATM) network, a wireless network, a telecommunications network, or the like.

Although in FIG. 1, the dedicated server computer systems 140a to 140e are illustrated as being connected to the server computer system 120 (and the computing device 110) by way of the network 130, in one or more embodiments the dedicated server computer systems 140a to 140e may be connected to the server computer system 120 by way of a different network such as a private network. In this example, the computing device 110 may only communicate with the dedicated server computer systems 140a to 140e by way of the server computer system 120 via the network 130.

Figure 2:
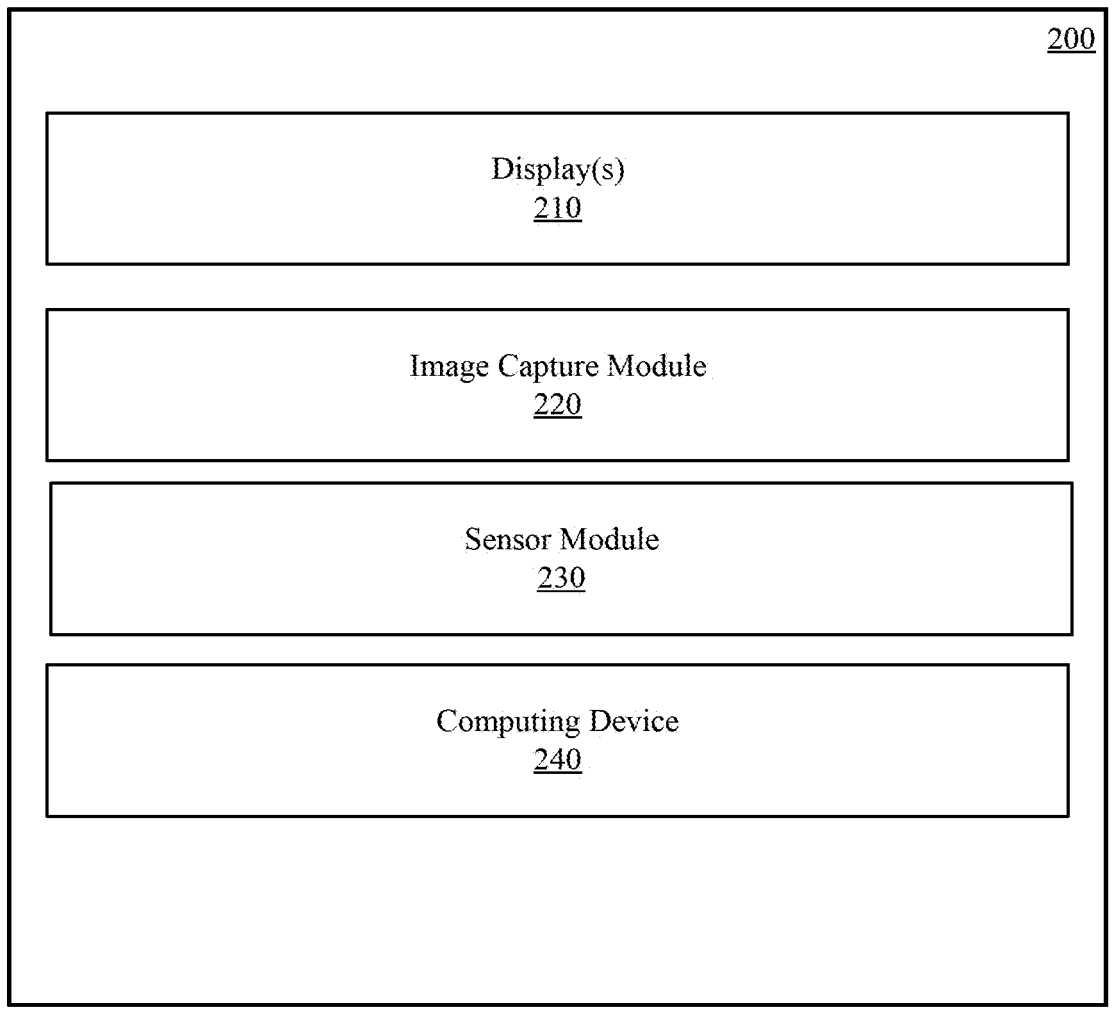
FIG. 2 is a simplified schematic diagram showing components of a computing device.

FIG. 2 is a simplified schematic diagram showing components of an exemplary computing device 200. The computing device 110 may be of the same type as computing device 200. The computing device 200 may include modules including, as illustrated, for example, one or more displays 210, an image capture module 220, a sensor module 230, and a computer device 240.

The one or more displays 210 are a display module. The one or more displays 210 are used to display screens of a graphical user interface that may be used, for example, to communicate with the server computer system 120 (FIG. 1). The one or more displays 210 may be internal displays of the computing device 200 (e.g., disposed within a body of the computing device).

The image capture module 220 may be or may include a camera. The image capture module 220 may be used to obtain image data, such as images. The image capture module 220 may be or may include a digital image sensor system as, for example, a charge coupled device (CCD) or a complementary metal—oxide—semiconductor (CMOS) image sensor.

The sensor module 230 may be a sensor that generates sensor data based on a sensed condition. By way of example, the sensor module 230 may be or include a location subsystem which generates location data indicating a location of the computing device 200. The location may be the current geographic location of the computing device 200. The location subsystem may be or include any one or more of a global positioning system (GPS), an inertial navigation system (INS), a wireless (e.g., cellular) triangulation system, a beacon-based location system (such as a Bluetooth low energy beacon system), or a location subsystem of another type.

The computer device 240 is in communication with the one or more displays 210, the image capture module 220, and the sensor module 230. The computer device 240 may be or may include a processor which is coupled to the one or more displays 210, the image capture module 220, and/or the sensor module 230.

Figure 3:
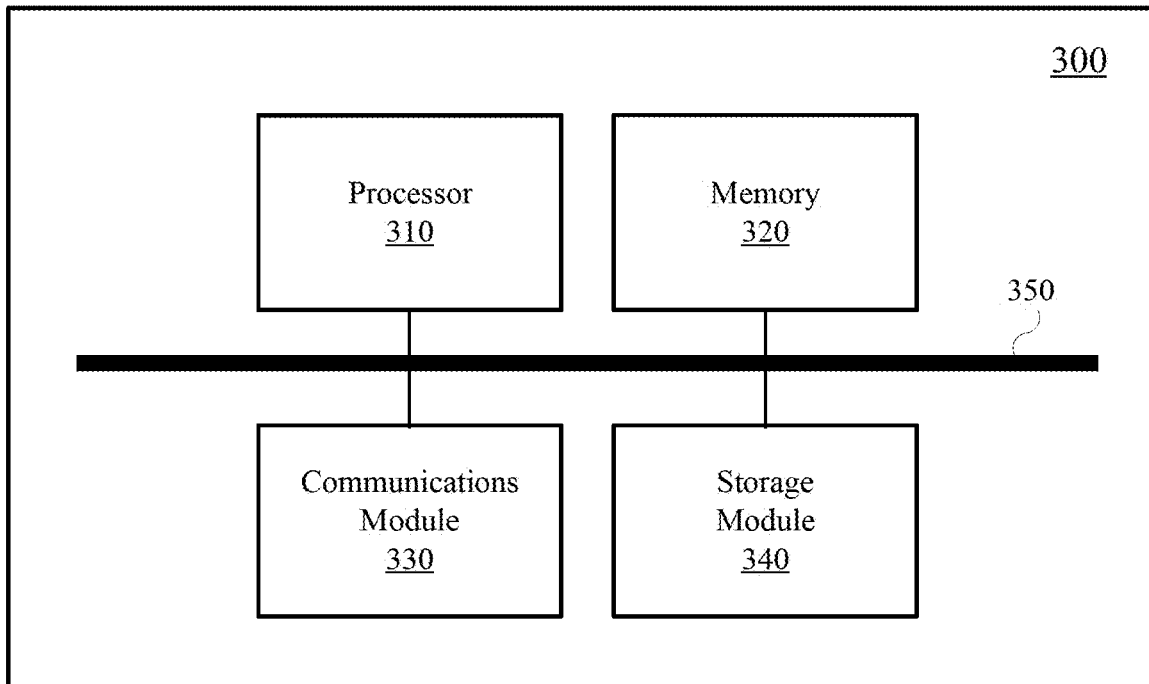
FIG. 3 is a high-level schematic diagram of an example computer device.

Referring now to FIG. 3, a high-level operation diagram of an example computer device 300 is shown. In some embodiments, the computer device 300 may be exemplary of the computer device 240 (FIG. 2), the server computer system 120, and/or the dedicated server computer systems 140a to 140e.

The example computer device 300 includes a variety of modules. For example, as illustrated, the example computer device 300 may include a processor 310, a memory 320, a communications module 330, and/or a storage module 340. As illustrated, the foregoing example modules of the example computer device 300 are in communication over a bus 350.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are non-transitory computer-readable storage mediums. A computer-readable medium may be organized using a file system such as may be administered by an operating system governing overall operation of the example computer device 300.

The communications module 330 allows the example computer device 300 to communicate with other computer or computing devices and/or various communications networks. For example, the communications module 330 may allow the example computer device 300 to send or receive communications signals. Communications signals may be sent or received according to one or more protocols or according to one or more standards. For example, the communications module 330 may allow the example computer device 300 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 330 may allow the example computer device 300 to communicate using near-field communication (NFC), via Wi-Fi (TM), using Bluetooth (TM) or via some combination of one or more networks or protocols. In some embodiments, all or a portion of the communications module 330 may be integrated into a component of the example computer device 300. For example, the communications module may be integrated into a communications chipset. In some embodiments, the communications module 330 may be omitted such as, for example, if sending and receiving communications is not required in a particular application.

The storage module 340 allows the example computer device 300 to store and retrieve data. In some embodiments, the storage module 340 may be formed as a part of the memory 320 and/or may be used to access all or a portion of the memory 320. Additionally or alternatively, the storage module 340 may be used to store and retrieve data from persisted storage other than the persisted storage (if any) accessible via the memory 320. In some embodiments, the storage module 340 may be used to store and retrieve data in a database. A database may be stored in persisted storage. Additionally or alternatively, the storage module 340 may access data stored remotely such as, for example, as may be accessed using a local area network (LAN), wide area network (WAN), personal area network (PAN), and/or a storage area network (SAN). In some embodiments, the storage module 340 may access data stored remotely using the communications module 330. In some embodiments, the storage module 340 may be omitted and its function may be performed by the memory 320 and/or by the processor 310 in concert with the communications module 330 such as, for example, if data is stored remotely. The storage module may also be referred to as a data store.

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

Figure 4:
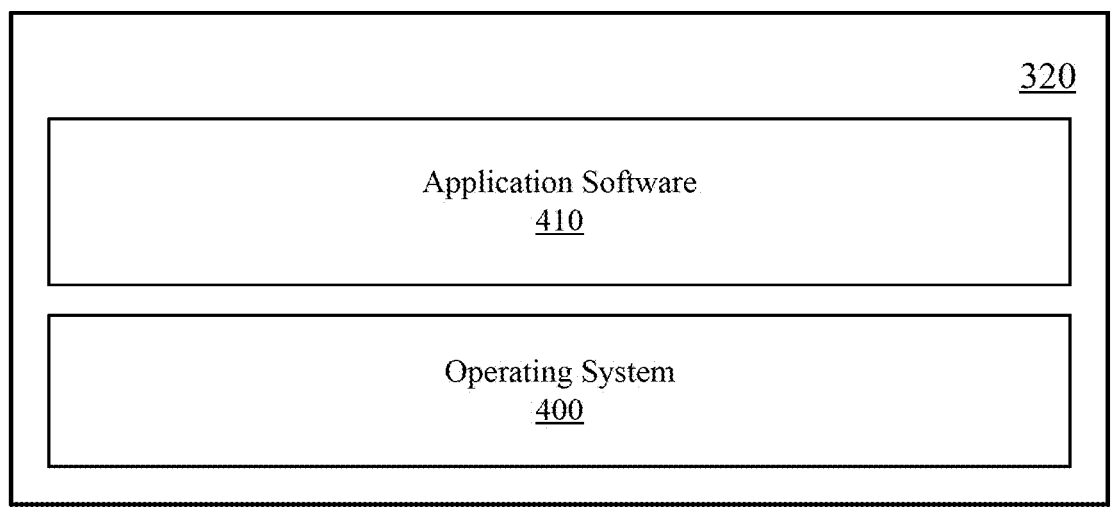
FIG. 4 shows a simplified organization of software components stored in a memory of the example computer device of FIG. 3.

FIG. 4 depicts a simplified organization of software components stored in the memory 320 of the example computer device 300 (FIG. 3). As illustrated, these software components include an operating system 400 and an application 410.

The operating system 400 is software. The operating system 400 allows the application 410 to access the processor 310 (FIG. 3), the memory 320, and the communications module 330 of the example computer device 300 (FIG. 3). The operating system 400 may be, for example, Google (TM) Android (TM), Apple (TM) iOS (TM), UNIX (TM), Linux (TM), Microsoft (TM) Windows (TM), Apple OSX (TM) or the like.

The application 410 adapts the example computer device 300, in combination with the operating system 400, to operate as a device performing a particular function. For example, the application 410 may cooperate with the operating system 400 to adapt a suitable embodiment of the example computer device 300 to operate as the computer device 240 (FIG. 2), the server computer system 120, and/or the dedicated server computer systems 140a to 140e.

While a single application 410 is illustrated in FIG. 3, in operation the memory 320 may include more than one application 410 and different applications 410 may perform different operations. For example, in at least some embodiments in which the computer device 300 is functioning as the computing device 110, the applications 410 may include application for displaying a graphical user interface associated with a series of activation steps. The application may be provided as a web application and/or a mobile application.

In another example, in at least some embodiments in which the computer device 300 is functioning as the computing device 110, the applications 410 may include a banking application. The banking application may be configured for secure communications with the server computer system 120 and may provide various banking functions such as, for example, the ability to display a quantum of value in one or more transfer records (e.g. display balances), configure transfers of data (e.g. bill payments and other transfers), and account management functions. The graphical user interface associated with the series of activation steps may be presented within the banking application and the activation may be associated with activation of a payment card such as a physical credit card.

By way of further example, in at least some embodiments in which the computer device 300 functions as the computing device 110, the applications 410 may include a web browser, which may also be referred to as an Internet browser. In at least some such embodiments, the server computer system 120 may be a web server that may serve one or more of the graphical user interfaces described herein. The web server may cooperate with the web browser and may serve as an interface when the interface is requested through the web browser. For example, the web browser may serve as a mobile banking interface. The mobile banking interface may provide various banking functions such as, for example, the ability to display a quantum of value in one or more transfer records (e.g. display balances), configure transfers of data (e.g. bill payments and other transfers), and account management functions. The graphical user interface associated with the series of activation steps may be presented within the web browser and the activation may be associated with activation of a payment card such as a physical credit card.

As mentioned, the server computer system 120 may be configured to manage a series of activation steps and/or the dedicated server computer systems 140a to 140e. In one or more embodiments, the server computer system 120 may initiate activation and cause the dedicated server computer systems 140a to 140e to perform operations to complete the series of activation steps. In one or more embodiments, the activation steps must be completed in series, that is, a first activation step must be completed prior to a second activation step being completed. As such, the server computer system 120 may orchestrate or otherwise perform operations to initiate the completion of each activation step.

As one example, the server computer system 120 may receive a request to initiate activation. In response, the server computer system 120 may determine a series of activation steps that must be performed for the activation. The server computer system 120 may identify or otherwise determine the dedicated server computer systems required to complete the series of activation steps.

In one or more embodiments, each activation step may be performed by a different dedicated server computer system 140a to 140e. For example, the server computer system 120 may determine that the series of activation steps includes a series of five (5) activation steps S1, S2, S3, S4 and S5 and may determine that dedicated server computer systems 140a, 140b, 140c, 140d and 140e are required to complete the respective activation steps. As such, the server computer system 120 may send a request to complete activation step S1 to the dedicated server computer system 140a. Once complete, the dedicated server computer system 140a may send an indication of completion of the activation step S1. The server computer system 120 may then send a request to complete activation step S2 to the dedicate server computer system 140b. Once complete, the dedicated server computer system 140b may send an indication of completion of the activation step S2. The server computer system 120 may then send a request to complete activation step S3to the dedicate server computer system 140c. Once complete, the dedicated server computer system 140c may send an indication of completion of the activation step S3. The server computer system 120 may then send a request to complete activation step S4 to the dedicate server computer system 140d. Once complete, the dedicated server computer system 140d may send an indication of completion of the activation step S4. The server computer system 120 may then send a request to complete activation step S5 to the dedicate server computer system 140e. Once complete, the dedicated server computer system 140*e* may send an indication of completion of the activation step S5. The server computer system 120 may then determine that the activation is complete.

The server computer system 120 may be configured to provide a graphical user interface to the computing device 110 that may be used to track, in real-time, the activation.

Figure 5:
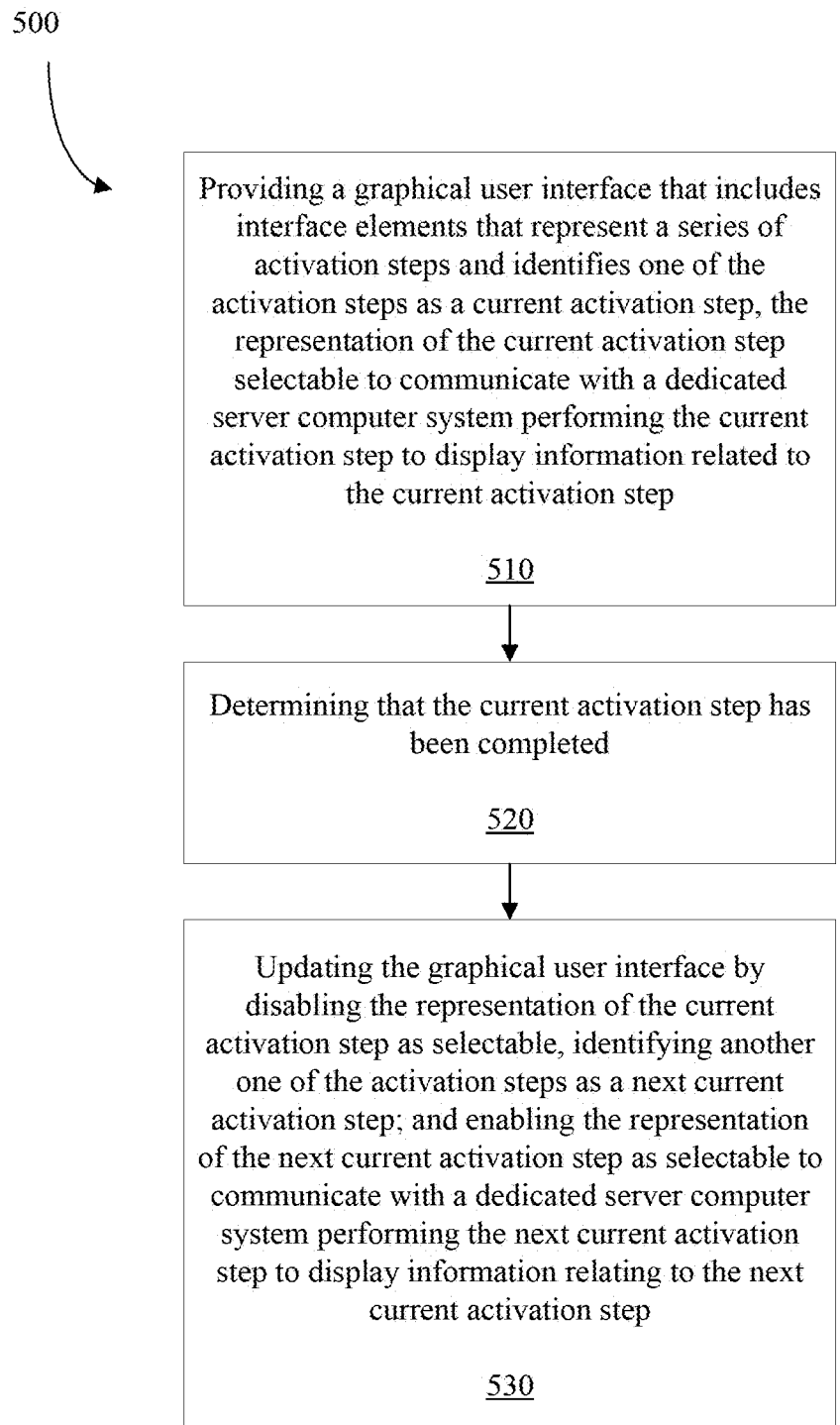
FIG. 5 is a flowchart showing operations performed by a server computer system in providing a graphical user interface according to an embodiment.

Reference is made to FIG. 5, which illustrates, in flowchart form, a method 500 for providing a graphical user interface. The method 500 may be implemented by a computing device having suitable processor-executable instructions for causing the computing device to carry out the described operations. The method 500 may be implemented, in whole or in part, by the server computer system 120. It will be appreciated that some of the operations may be offloaded to the computing device 110.

The method 500 includes providing a graphical user interface that includes interface elements that represent a series of activation steps and identifies one of the activation steps as a current activation step, the representation of the current activation step selectable to communicate with a dedicated server computer system performing the current activation step to display information related to the current activation step (step 510).

In one or more embodiments, the server computer system 120 generates the graphical user interface based on the number of activation steps in the series of activation steps. For example, the server computer system 120 may determine that a total of five (5) activation steps in the series, the five (5) activation steps required to complete the activation. As such, the server computer system 120 may generate the graphical user interface to include five (5) interface elements that represent the series of activation steps.

Figure 6:
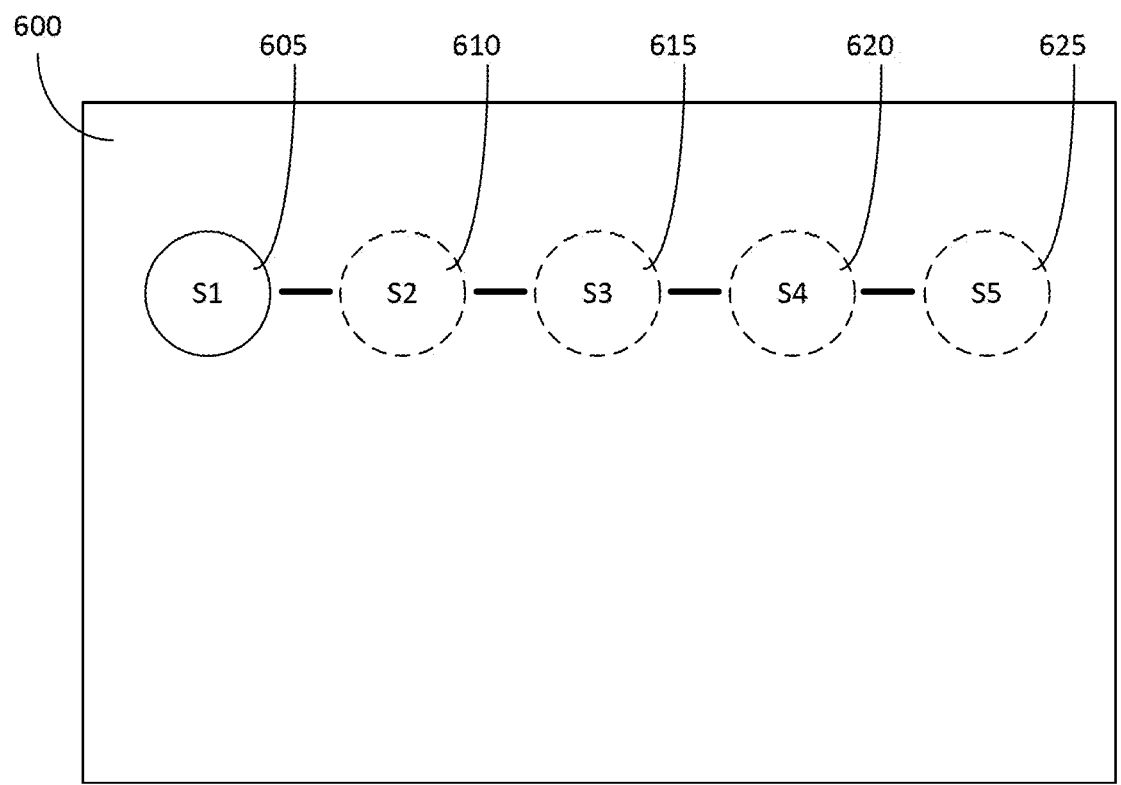
FIG. 6 is an example graphical user interface.

An example graphical user interface 600 is shown in FIG. 6. As can be seen, the graphical user interface 600 includes interface elements 605, 610, 615, 620 and 625 that represent a series of activation steps S1, S2, S3, S4 and S5, respectively. In this example, the dedicated server computer systems 140*a*, 140*b*, 140*c*, 140*d* and 140*e* are responsible for completing activation steps S1, S2, S3, S4 and S5, respectively.

The graphical user interface identifies one of the activation steps as a current activation step. The current activation step may include an activation step that is currently being completed by one of the dedicated server computer systems. In the example shown in FIG. 6, the graphical user interface 600 identifies the activation step S1 as the current activation step by presenting or displaying the interface element 605 in a different format than the other interface elements 610, 615, 620, 625. In this example, the different format includes displaying the interface element 605 in solid lines where the other interface elements 610, 615, 620, 625 are displaying in stippled or dotted lines. It will be appreciated that identifying the current activation step may additionally or alternatively include presenting or displaying the interface element in a different colour, size, shape, etc. compared to the other interface elements.

The representation of the current activation step is enabled as selectable to communicate with the dedicated server computer system performing the current activation step to display information related to the current activation step. In one or more embodiments, the representation of the current activation step may be selected by, for example, the user performing a tap gesture on a display screen of the computing device 110 that corresponds to a location of the representation of the current activation step on the graphical user interface. In the example shown in FIG. 6, the interface element 605 that is the representation of the current activation step S1 is selectable on the graphical user interface. It will be appreciated that the other interface elements 610, 615, 620, 625 are not selectable. Put another way, if the user performs a tap gesture on the display screen of the computing device 110 that corresponds to the location of any one of the interface elements 610, 615, 620, 625, no actions will be performed by the computing device 110 or the server computer system 120. In this manner, communication between the computing device 110 and/or the server computer system 120 to any of the dedicated server computer systems that are not performing the current activation step is prevented and this may reduce or minimize network usage.

The user may select the representation of the current activation step by performing a tap gesture on the display screen of the computing device 110 that corresponds to a location of the representation of the current activation step on the graphical user interface. In response to selection of the representation of the current activation step, information related to the current activation step may be obtained in real-time from the dedicated server computer system performing the current activation step and displayed on the graphical user interface.

In one or more embodiments, to obtain the information from the dedicated server computer system performing the current activation step, the server computer system 120 may perform operations to enable communication between the computing device 110 and the dedicated server computer system performing the current activation step to obtain the information from the dedicated server computer system.

Figure 7:
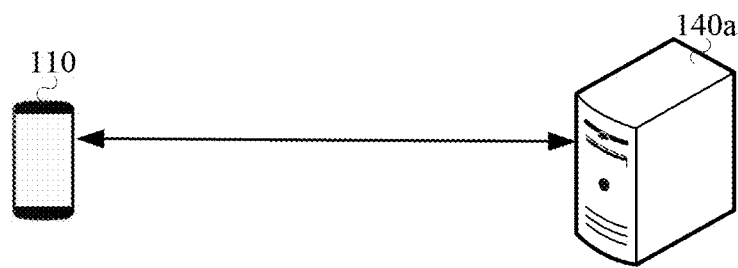
FIG. 7 is a schematic operation diagram showing communication between a computing device and dedicated server computer system.

An example is shown in FIG. 7. As can be seen, the computing device 110 communicates with the dedicated server computer system 140*a* to obtain, in real-time, information related to the current activation step. Although not shown, it will be appreciated that the computing device 110 may communicate with the dedicated server computer system 140*a* over a network such as the network 130. The information obtained from the dedicated server computer system 140*a* may be displayed on the graphical user interface.

In one or more embodiments, the server computer system 120 may perform operations to obtain the information directly from the dedicated server computer system. In these embodiments, the graphical user interface is updated to display the information related to the current activation step.

In the example shown in FIG. 6, the user may select the interface element 605 and in response the server computer system 120 may receive, from the computing device 110, an indication of selection of the interface element 605. In response, the information related to the current activation step may be obtained, in real-time, from the dedicated server computer system 140*a* and the graphical user interface may be updated to display the information related to the current activation step.

Figure 8:
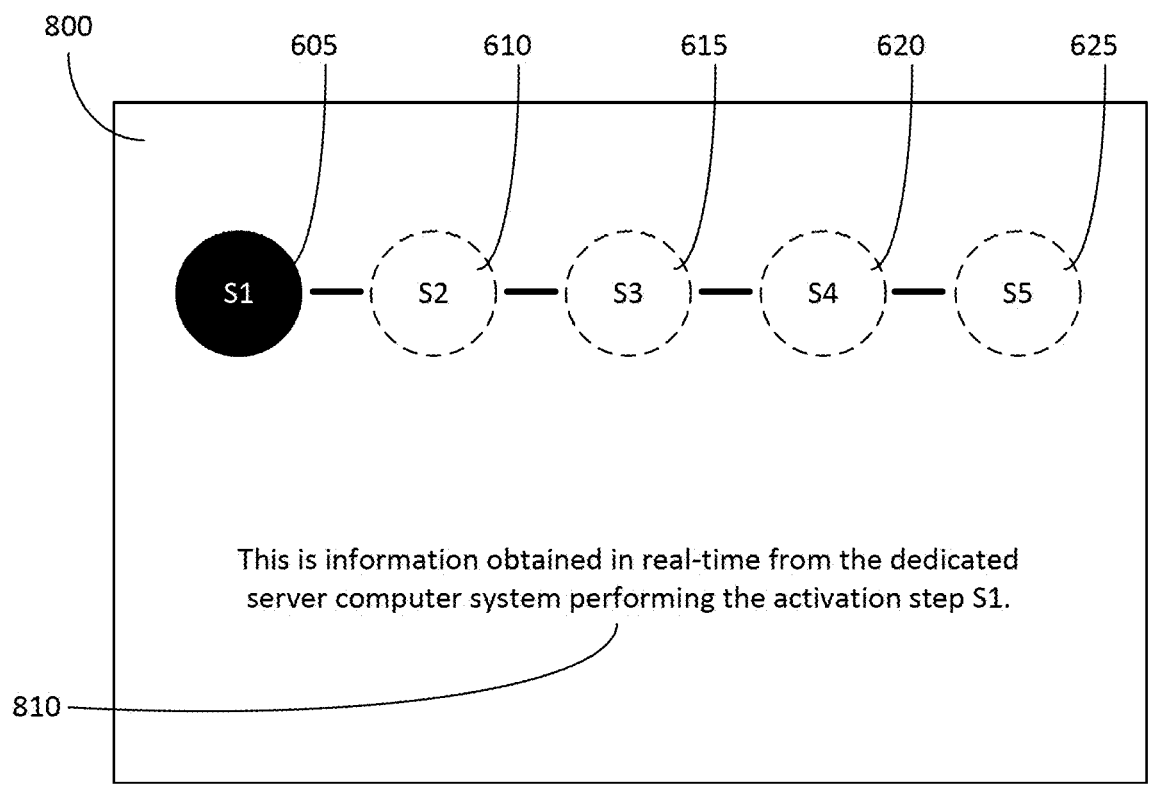
FIG. 8 is an example graphical user interface.

An example updated graphical user interface 800 is shown in FIG. 8. As can be seen, the updated graphical user interface 800 displays information 810 received from the dedicated server computer system 140*a* performing the current activation step S1. The updated graphical user interface 800 has also updated the graphical user interface to highlight the interface element 605 indicating that the interface element 605 has been selected.

In one or more embodiments, the graphical user interface may additionally display at least one selectable interface element to cause the computing device 110 to communicate with the dedicated server computer system performing the current activation step to perform an operation associated with the current activation step. For example, the current activation step may require that an operation be performed before the current activation step can be completed.

Figure 9:
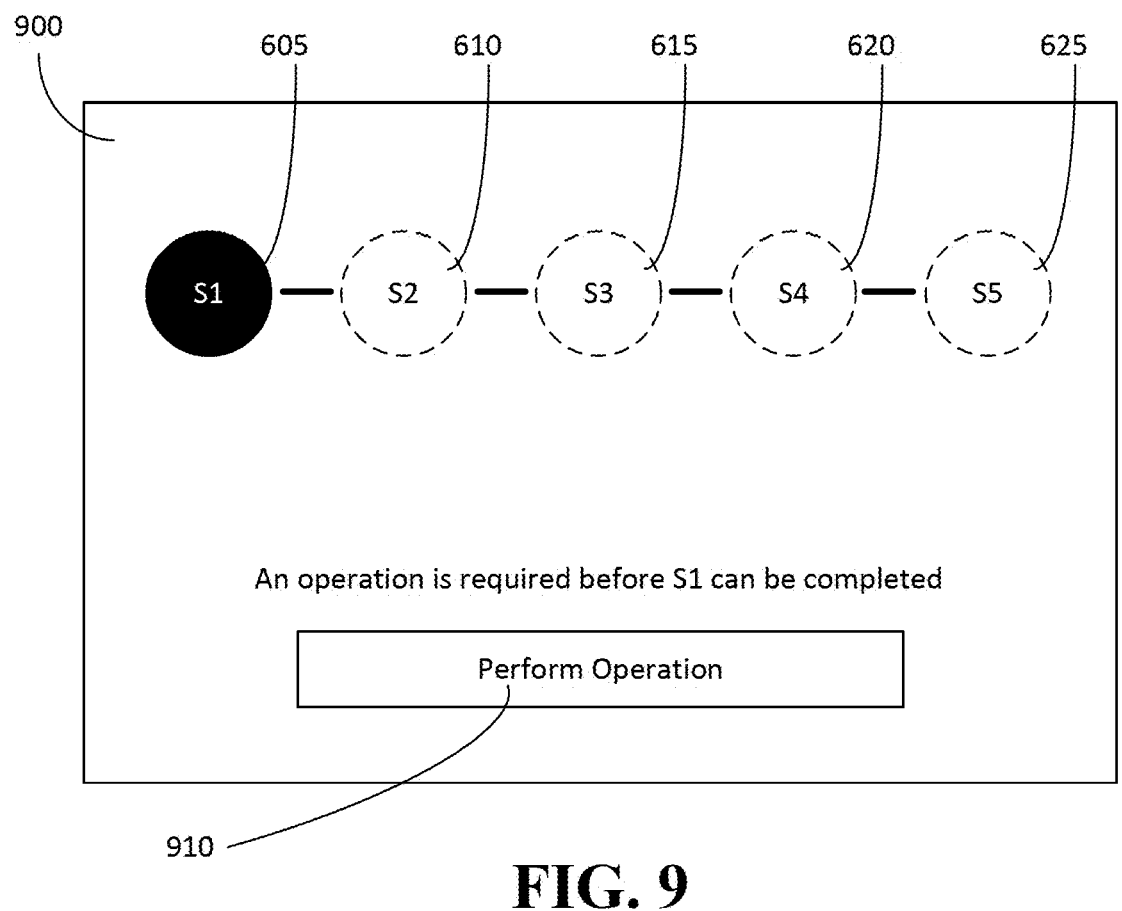
FIG. 9 is another example graphical user interface.

An example graphical user interface 900 is shown in FIG. 9. As can be seen, the graphical user interface 900 includes a selectable interface element 910 to cause the computing device to communicate with the dedicated server computer system performing the current activation step to perform an operation associated with the current activation step.

In one or more embodiments, the operation may include real-time provisioning of a mobile wallet resident on the computing device with a digital payment card. As such, selection of the selectable interface element 910 may cause the dedicated server computer system performing the current activation step to perform operations to provision the mobile wallet resident on the computing device 110 in real-time with a digital payment card that may be immediately used for payment.

In one or more embodiments, the operation may include the submission of data such as for example the submission of one or more documents or images that may be required to complete the current activation step. As such, selection of the selectable interface element 910 may cause the computing device 110 to open a camera application resident thereon to enable image capture by an imaging device of the computing device 110. In this example, the camera application may be used to capture and submit images from the computing device 110 to the dedicated server computer system performing the current activation step and this may be done as a requirement to complete the current activation step.

In one or more embodiments, the operation may include the tracking of a physical item. As such, selection of the selectable interface element 910 may enable communication with a third-party server to obtain tracking information of the physical item associated with the current activation step. The tracking information may be displayed on the display screen of the computing device 110 within the graphical user interface or may displayed in a separate window, pop-up screen, notification screen, etc.

The method 500 includes determining that the current activation step has been completed (step 520).

The dedicated server computer system performing the current activation step may send an indication to the server computer system 120 indicating that the current activation step has been completed. As such, in one or more embodiments, the server computer system 120 determines that the current activation step has been completed in response to receiving the indication from the dedicated server computer system performing the current activation step that the current activation step has been completed.

In one or more embodiments, the computing device 110 may receive the indication from the dedicated server computer system performing the current activation step that the current activation step has been completed and may communicate the indication to the server computer system 120.

The method 500 includes updating the graphical user interface by disabling the representation of the current activation step as selectable, identifying another one of the activation steps as a next current activation step; and enabling the representation of the next current activation step as selectable to communicate with a dedicated server computer system performing the next current activation step to display information relating to the next current activation step (step 530).

Responsive to determining that the current activation step has been completed, the server computer system 120 disables the representation of the current activation step as selectable. In this manner, the user can no longer select the representation of the current activation step and this prevents unnecessary communication between the computing device 110 and/or the server computer system 120 and the dedicated server computer system that completed the current activation step. As a result, network usage is reduced or minimized.

The server computer system 120 identifies another one of the activation steps as a next current activation step. In one or more embodiments, the activation steps include a series of activation steps and as such the next current activation step may include the next activation step in the series of the activation steps. For example, the current activation step may be activation step S1 and the next current activation step may be activation step S2.

Once the next current activation step has been identified, the representation of the next current activation step is enabled as selectable to communicate with a dedicated server computer system performing the next current activation step to display information relating to the next current activation step.

Figure 10:
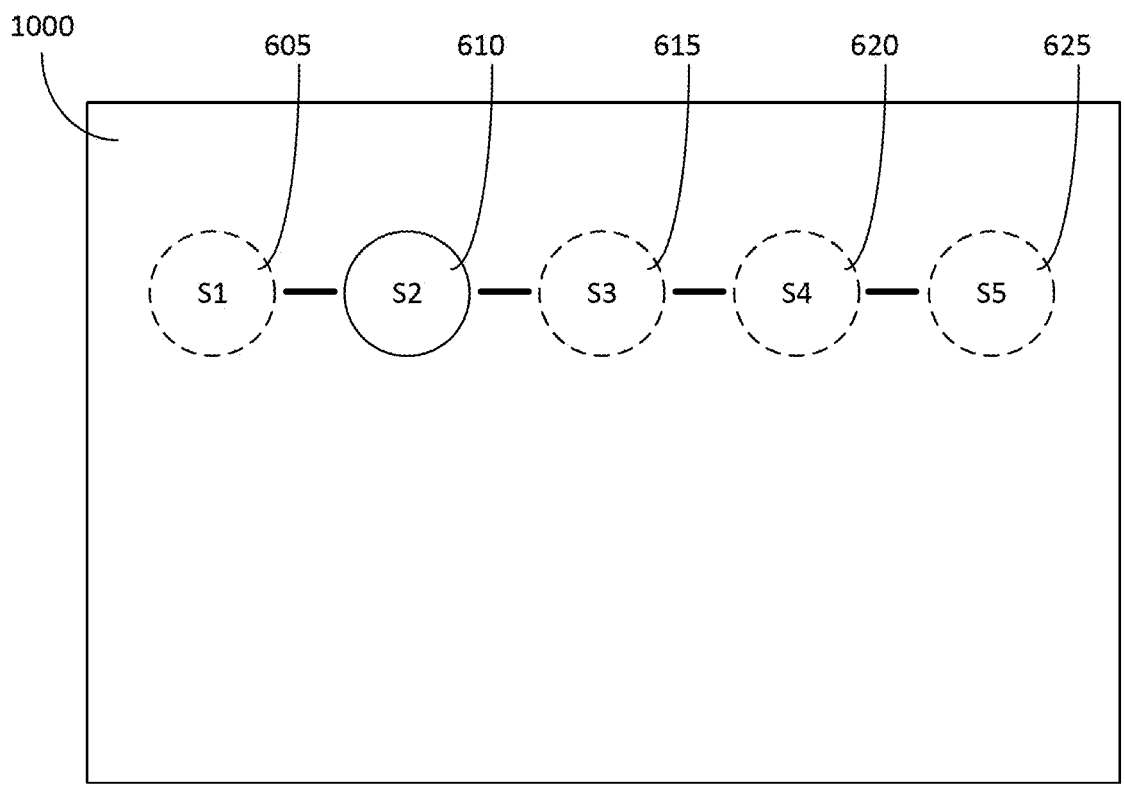
FIG. 10 is yet another example graphical user interface.

An example updated graphical user interface 1000 is shown in FIG. 10. The updated graphical user interface 1000 may be an updated version of the graphical user interface 600 shown in FIG. 6.

The graphical user interface 1000 identifies the next current activation step. The next current activation step may include an activation step that is currently being completed by one of the dedicated server computer systems. In the example shown in FIG. 10, the graphical user interface 1000 identifies the activation step S2 as the current activation step by presenting or displaying the interface element 610 in a different format than the other interface elements 605, 615, 620, 625. In this example, the different format includes displaying the interface element 610 in solid lines where the other interface elements 605, 615, 620, 625 are displaying in stippled or dotted lines. It will be appreciated that identifying the current activation step may additionally or alternatively include presenting or displaying the interface element in a different colour, size, shape, etc. compared to the other interface elements.

In the example shown in FIG. 10, the graphical user interface 1000 has also been updated to disable the representation of the current activation step as selectable. Specifically, the interface element 605 has been disabled as selectable and as such is displayed in the same format as interface elements 615, 620, 625 and this indicates that the interface element 605 is not selectable.

Figure 11:
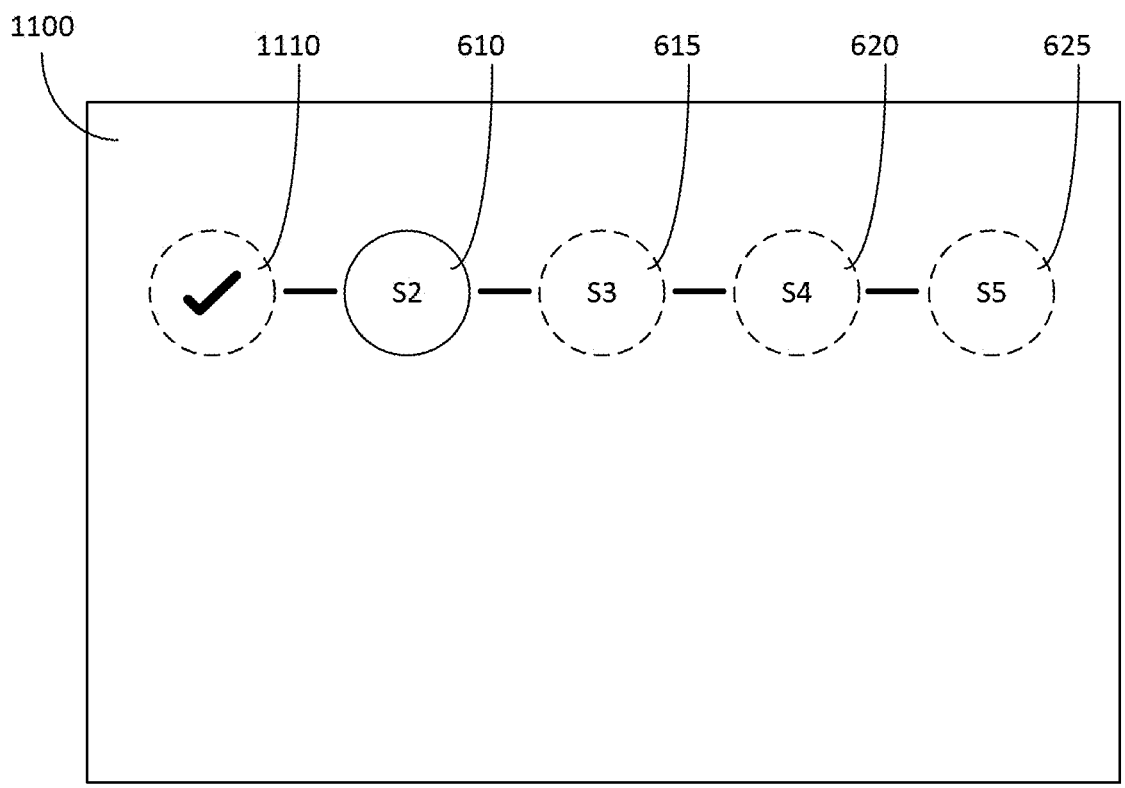
FIG. 11 is still yet another example graphical user interface.

In one or more embodiments, the representation of the current activation step may be updated to indicate that the current activation step has been completed. An example is shown in FIG. 11. As can be seen, an updated graphical user interface 1100 displays the representation of the current activation step (interface element 1110) as a checkmark indicating that the current activation step has been completed. The interface element 1110 is displayed in stippled lines, similar to the interface elements 615, 620, 625 and this indicates that the interface element 1110 is not selectable.

As mentioned, the representation of the next current activation step is enabled as selectable to communicate with the dedicated server computer system performing the next current activation step to display information related to the current activation step. In one or more embodiments, the representation of the next current activation step may be selected by, for example, the user performing a tap gesture on a display screen of the computing device 110 that corresponds to a location of the representation of the current activation step on the graphical user interface. Referring back to the example shown in FIG. 10, the interface element 610 that is the representation of the next current activation step S2 is selectable on the graphical user interface. It will be appreciated that the other interface elements 605, 615, 620, 625 are not selectable. Put another way, if the user performs a tap gesture on the display screen of the computing device 110 that corresponds to the location of any one of the interface elements 605, 615, 620, 625, no actions will be performed by the computing device 110 or the server computer system 120. In this manner, communication between the computing device 110 and/or the server computer system 120 to any of the dedicated server computer systems that are not performing the next current activation step is prevented and this may reduce or minimize network usage.

The user may select the representation of the next current activation step by performing a tap gesture on the display screen of the computing device 110 that corresponds to a location of the representation of the next current activation step on the graphical user interface. In response to selection of the representation of the next current activation step, information related to the next current activation step may be obtained in real-time from the dedicated server computer system performing the next current activation step and displayed on the graphical user interface.

In one or more embodiments, to obtain the information from the dedicated server computer system performing the next current activation step, the server computer system 120 may perform operations to enable communication between the computing device 110 and the dedicated server computer system performing the next current activation step to obtain the information from the dedicated server computer system.

Figure 12:
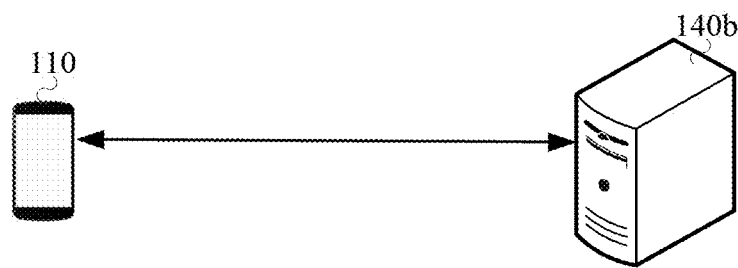
FIG. 12 is a schematic operation diagram showing communication between a computing device and another dedicated server computer system.

An example is shown in FIG. 12. As can be seen, the computing device 110 communicates with the dedicated server computer system 140b to obtain, in real-time, information related to the next current activation step. Although not shown, it will be appreciated that the computing device 110 may communicate with the dedicated server computer system 140b over a network such as the network 130. The information obtained from the dedicated server computer system 140b may be displayed on the graphical user interface.

In one or more embodiments, the server computer system 120 may perform operations to obtain the information directly from the dedicated server computer system. In these embodiments, the graphical user interface is updated to display the information related to the next current activation step.

In the example shown in FIG. 10, the user may select the interface element 610 and in response the server computer system 120 may receive, from the computing device 110, an indication of selection of the interface element 610. In response, the information related to the next current activation step may be obtained, in real-time, from the dedicated server computer system 140b and the graphical user interface may be updated to display the information related to the next current activation step.

Figure 13:
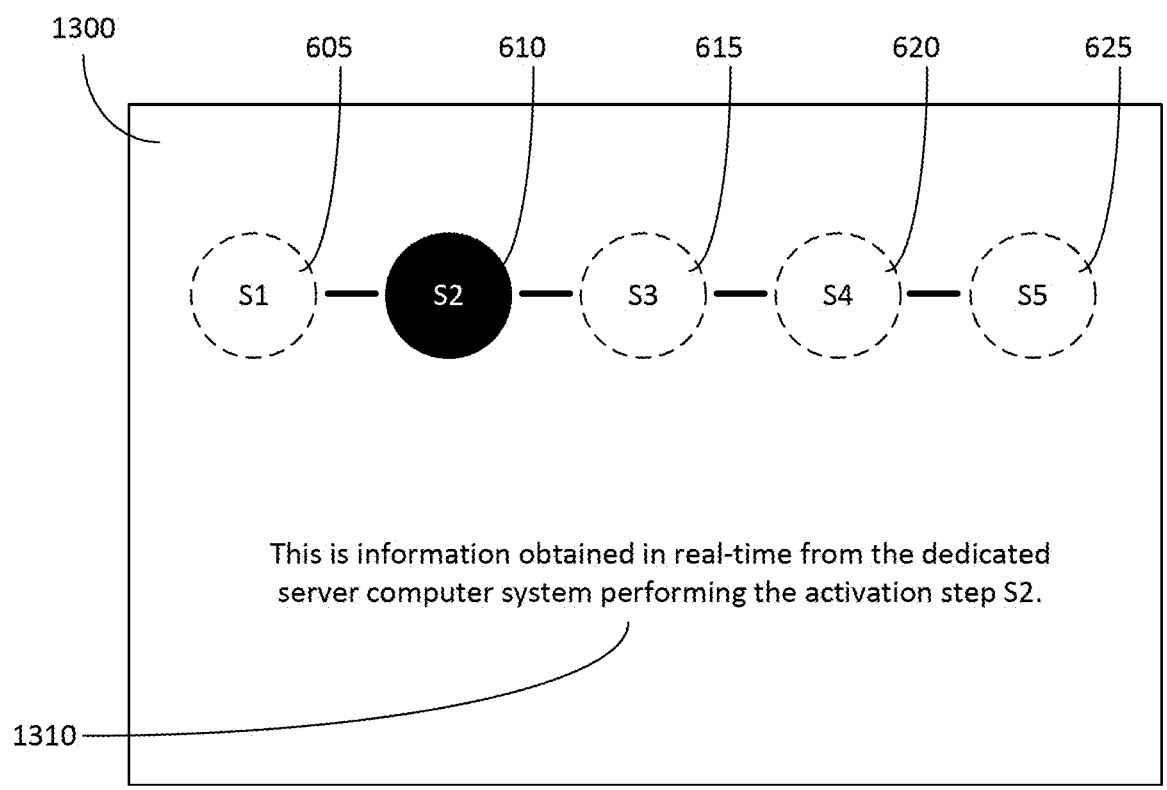
FIG. 13 is an example graphical user interface.

An example updated graphical user interface 1300 is shown in FIG. 13. As can be seen, the updated graphical user interface 1300 displays information 1310 received from the dedicated server computer system 140b performing the next current activation step S2. The updated graphical user interface 1300 has also updated the graphical user interface to highlight the interface element 610 indicating that the interface element 610 has been selected.

In one or more embodiments, the graphical user interface may additionally display at least one selectable interface element to cause the computing device 110 to communicate with the dedicated server computer system performing the next current activation step to perform an operation associated with the next current activation step and this may be done in manners similar to that described herein with reference to FIG. 9, for example.

It will be appreciated that the method 500 is continuously performed until the entire series of activation steps has been completed.

In manners described herein, a simple graphical user interface is displayed that displays a visual representation of a series of activation steps. The simplicity of the graphical user interface allows computing devices that have particularly small display screens to display the entire series of activation steps. Further, by enabling a representation of a current activation step as selectable to obtain and display information, the number of steps required to obtain real-time information on the activation is reduced. Further, by enabling only a representation of a current activation step as selectable, communication to dedicated server computer systems that are not currently performing the current activation step is blocked and as a result this may reduce or minimize network usage. Put another way, the computing device 110 is only permitted to communicate with the dedicated server computer system performing the current activation step and as such network traffic is reduced.

In one or more embodiments, the activation steps may be associated with payment card activation or renewal. The payment card may be, for example, a credit card. In these embodiments, the method, system and graphical user interface described herein may be used to track and manage the payment card activation. For example, payment card activation may require five (5) activation steps that must be performed in series. The steps may include receiving and reviewing a payment card application, approving or conditionally approving the payment card application, providing a digital version of the payment card to a digital wallet and making available documentation associated with the payment card approval, sending a physical payment card, and activating the physical payment card. Each one of the steps may be performed by one or more dedicated server computer systems.

Operations may be required to be performed to complete one or more of the activation steps. For example, in one or more embodiments, activating the physical payment card may include or may require sending an internet protocol (IP) address or sending location data from the computing device 110 to the dedicated server computer system performing the activation step of activating the physical payment card. As such, a selectable interface element may be presented, in manners similar to that described herein, that, when selected, causes the computing device to display the IP address or the location data to the dedicated server computer system where the dedicated server computer system may verify that the IP address or the location data matches data records associated with the user activating the physical payment card. In this manner, the IP address or the location data may be used to activate the physical payment card.

Although in embodiments described herein, information is displayed on the graphical user interface in response to selection of the representation of the current activation step (or next current activation step), in one or more embodiments the information may be displayed automatically. In these embodiments, the server computer system 120 and/or the computing device 110 may automatically obtain information from the dedicated server computer system performing the current activation step (or next current activation step) and the obtained information may be displayed on the graphical user interface. Further, the representation of the current activation step may selectable to display additional information. For example, the graphical user interface may display a summary of information obtained from the dedicated server computer system performing the current activation step (or next current activation step) and, responsive to selection of the representation of the current activation step (or next current activation step), additional or more detailed information may be displayed.

Although in embodiments described herein, each activation step is described as being performed by a different dedicated server computer system, in one or more embodiments a dedicated server computer system may perform more than one activation step. For example, a first dedicated server computer system may perform two activation steps, a second dedicated server computer system may perform two activation steps, and a third dedicated server computer system may perform a single activation step. In these embodiments, the two activation steps performed by the first dedicated server computer system may be sequential where a first one of the activation steps is performed and then a second one of the activation steps is performed. In this example, network usage is minimized as a server computer system completes all activation steps it is responsible for before engaging the network and sending the activation to the next dedicated server computer system for performing the next activation step (or next activation steps). Put another way, by ensuring that a dedicated server computer system responsible for completing more than one activation step completes activation steps that are in sequence, the overall reliance on the network is reduced.

The methods described herein may be modified and/or operations of such methods combined to provide other methods.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the herein discussed embodiments are considered to be illustrative and not restrictive.

What is claimed is:

1. A server computer system comprising:
a communications module;
a processor coupled with the communications module; and
a memory coupled to the processor and storing processor-executable instructions which, when executed by the processor, configure the processor to:
provide, via the communications module and to a computing device, a graphical user interface that includes interface elements that represent a series of activation steps and identifies one of the activation steps as a current activation step, the representation of the current activation step selectable to communicate with a dedicated server computer system performing the current activation step to display information related to the current activation step;
determine that the current activation step has been completed; and
update the graphical user interface to:
disable the representation of the current activation step as selectable;
identify another one of the activation steps as a next current activation step; and
enable the representation of the next current activation step as selectable to communicate with a dedicated server computer system performing the next current activation step to display information relating to the next current activation step.

2. The server computer system of claim 1, wherein the processor-executable instructions, when executed by the processor, further configure the processor to:
receive, via the communications module and from the computing device, an indication of selection of the representation of the current activation step; and
obtain, in real-time and from the dedicated server computer system performing the current activation step, the information related to the current activation step.

3. The server computer system of claim 1, wherein the graphical user interface displays at least one selectable interface element to cause the computing device to communicate with the dedicated server computer system performing the current activation step to perform an operation associated with the current activation step.

4. The server computer system of claim 3, wherein the operation associated with the current activation step includes an operation required for completion of the current activation step.

5. The server computer system of claim 3, wherein, responsive to determining that the current activation step has been completed, the processor-executable instructions, when executed by the processor, further configure the processor to:
remove the at least one selectable interface element from the graphical user interface; and
display at least one next selectable interface element to cause the computing device to communicate with the dedicated server computer system performing the next current activation step to perform an operation associated with the next current activation step.

6. The server computer system of claim 3, wherein the operation includes real-time provisioning of a mobile wallet resident on the computing device with a digital payment card.

7. The server computer system of claim 3, wherein the at least one selectable interface element causes the computing device to open a camera application resident thereon to enable image capture by an imaging device of the computing device.

8. The server computer system of claim 3, wherein the operation includes communicating with a third-party server to obtain tracking information of a physical item associated with the current activation step.

9. The server computer system of claim 1, wherein the representation of a particular activation step, when identified as the current activation step, is enabled as selectable to cause the computing device to communicate with a dedicated server computer system performing the particular activation step.

10. The server computer system of claim 1, wherein each activation step is performed by a different dedicated server computer system.

11. A computer-implemented method comprising:
providing, via a communications module and to a computing device, a graphical user interface that includes interface elements that represent a series of activation steps and identifies one of the activation steps as a current activation step, the representation of the current activation step selectable to communicate with a dedicated server computer system performing the current activation step to display information related to the current activation step;
determining that the current activation step has been completed; and
updating the graphical user interface by:
disabling the representation of the current activation step as selectable;
identifying another one of the activation steps as a next current activation step; and
enabling the representation of the next current activation step as selectable to communicate with a dedicated server computer system performing the next current activation step to display information relating to the next current activation step.

12. The computer-implemented method of claim 11, further comprising:
receiving, via the communications module and from the computing device, an indication of selection of the representation of the current activation step; and
obtaining, in real-time and from the dedicated server computer system performing the current activation step, the information related to the current activation step.

13. The computer-implemented method of claim 11, wherein the graphical user interface displays at least one selectable interface element to cause the computing device to communicate with the dedicated server computer system performing the current activation step to perform an operation associated with the current activation step.

14. The computer-implemented method of claim 13, wherein the operation associated with the current activation step includes an operation required for completion of the current activation step.

15. The computer-implemented method of claim 13, wherein, responsive to determining that the current activation step has been completed, the method further comprises:
removing the at least one selectable interface element from the graphical user interface; and
displaying at least one next selectable interface element to cause the computing device to communicate with the dedicated server computer system performing the next current activation step to perform an operation associated with the next current activation step.

16. The computer-implemented method of claim 13, wherein the operation includes real-time provisioning of a mobile wallet resident on the computing device with a digital payment card.

17. The computer-implemented method of claim 13, wherein the at least one selectable interface element causes the computing device to open a camera application resident thereon to enable image capture by an imaging device of the computing device.

18. The computer-implemented method of claim 13, wherein the operation includes communicating with a third-party server to obtain tracking information of a physical item associated with the current activation step.

19. The computer-implemented method of claim 11, wherein the representation of a particular activation step, when identified as the current activation step, is enabled as selectable to cause the computing device to communicate with a dedicated server computer system performing the particular activation step.

20. A non-transitory computer readable storage medium comprising computer-executable instructions which, when executed, configure a processor to:
provide, via a communications module and to a computing device, a graphical user interface that includes interface elements that represent a series of activation steps and identifies one of the activation steps as a current activation step, the representation of the current activation step selectable to communicate with a dedicated server computer system performing the current activation step to display information related to the current activation step;
determine that the current activation step has been completed; and
update the graphical user interface to:
disable the representation of the current activation step as selectable;
identify another one of the activation steps as a next current activation step; and
enable the representation of the next current activation step as selectable to communicate with a dedicated server computer system performing the next current activation step to display information relating to the next current activation step.

* * * * *